United States Patent
Lou et al.

(10) Patent No.: US 12,456,196 B2
(45) Date of Patent: Oct. 28, 2025

(54) REPRESENTATION LEARNING FOR ORGANS AT RISK AND GROSS TUMOR VOLUMES FOR TREATMENT RESPONSE PREDICTION

(71) Applicant: Siemens Healthineers AG, Forchheim (DE)

(72) Inventors: Bin Lou, Princeton, NJ (US); Zhoubing Xu, Plainsboro, NJ (US); Ali Kamen, Skillman, NJ (US); Sasa Grbic, Plainsboro, NJ (US); Dorin Comaniciu, Princeton, NJ (US)

(73) Assignee: Siemens Healthineers AG, Forchheim (DE)

( * ) Notice: Subject to any disclaimer, the term of this patent is extended or adjusted under 35 U.S.C. 154(b) by 657 days.

(21) Appl. No.: 17/660,215

(22) Filed: Apr. 22, 2022

(65) Prior Publication Data
US 2023/0342933 A1  Oct. 26, 2023

(51) Int. Cl.
| | |
|---|---|
| A61B 5/00 | (2006.01) |
| G06T 7/00 | (2017.01) |
| G06T 7/11 | (2017.01) |
| G06T 9/00 | (2006.01) |
| G06V 10/42 | (2022.01) |
| G06V 10/764 | (2022.01) |
| G06V 10/774 | (2022.01) |

(Continued)

(52) U.S. Cl.
CPC ............ G06T 7/0014 (2013.01); A61B 5/726 (2013.01); A61B 5/7267 (2013.01); A61B 5/7275 (2013.01); G06T 7/11 (2017.01); G06T 9/002 (2013.01); G06V 10/42 (2022.01); G06V 10/764 (2022.01); G06V 10/7747 (2022.01); G16H 30/40 (2018.01); G16H 50/20 (2018.01); G06T 2207/10081 (2013.01); G06T 2207/20021 (2013.01); G06T 2207/20081 (2013.01); G06T 2207/20084 (2013.01); G06T 2207/30096 (2013.01)

(58) Field of Classification Search
CPC .............. G06T 7/0014; G06T 7/11; G06T 2207/10081; G06T 2207/20081; G06T 2207/20084; G06T 2207/30096; A61B 5/7275; A61B 5/7267; A61B 5/726
See application file for complete search history.

(56) References Cited

U.S. PATENT DOCUMENTS

2019/0371450 A1  12/2019  Lou et al.
2020/0069973 A1*  3/2020  Lou .................. G16H 30/20

OTHER PUBLICATIONS

Aerts, Hugo JWL, et al. "Decoding tumour phenotype by noninvasive imaging using a quantitative radiomics approach." Nature communications 5.1 (2014): 1-8.

(Continued)

*Primary Examiner* — Joel F Brutus

(57) ABSTRACT

For prediction of response of radiation therapy, radiomics are used for unsupervised machine training of an encoder-decoder network to predict based on input of image data, such as computed tomography image data and from segmentation. The trained encoder is then used to generate latent representations to be used as input to different classifiers or regressors for prediction of therapy responses, such as one classifier to predict response for an organ at risk and another classifier to predict another type of response for the organ at risk or to predict a response for the tumor.

20 Claims, 4 Drawing Sheets

(51) Int. Cl.
*G16H 30/40* (2018.01)
*G16H 50/20* (2018.01)

(56) References Cited

OTHER PUBLICATIONS

U.S. Appl. No. 17/645,463, filed Dec. 22, 2021.
Extended European Search Report (EESR) mailed Sep. 12, 2023 in corresponding European Patent Application No. 23169251.8.

* cited by examiner

REPRESENTATION LEARNING FOR ORGANS AT RISK AND GROSS TUMOR VOLUMES FOR TREATMENT RESPONSE PREDICTION

BACKGROUND

The present embodiments relate to therapy outcome prediction. Therapeutic procedures usually start with defining targets or tumors to be eradicated while the adjacent organs need to be spared. Deep learning-based solutions are used to automatically contour tumors and organs at risk. While boundaries of organs and tumor are important for planning therapy, the boundaries may not be readily used for treatment efficacy assessment and predicting treatment outcome and toxicity.

The tumor and organ texture characteristics in the images capture information that could potentially be used for therapy related responses. Radiomics uses image-based biomarkers to provide a deeper understanding of cancer biology to better aid clinical decisions. The practice of radiomics typically involves following discrete steps: a) acquisition of the images, b) identification the region of interest (ROI) and segmentation of the volumes, c) extraction and qualification of descriptive features from the volume, and d) development of models to predict outcomes. The critical part of radiomics is the extraction of high-dimension, quantitative feature data to describe attributes of the ROI. In classical radiomic analysis, image features that describe various tumor physical and geometrical characteristics are pre-defined and can be computed using mathematical formulas. These features usually quantify characteristics about tumor intensity, shape, and texture, and wavelet transformation focusing on the frequency domain. However, there are a few limitations of the state-of-the-art radiomics analysis: 1) to maximize the information obtained in radiomics, a very large number of features that contain lots of redundant information are usually extracted from images; 2) all hand-crafted radiomic features are in pre-defined groups so it is likely that some predictive information is not fully captured by the pre-defined features; and 3) the hand-crafted radiomics are fixed representations of the specific ROIs so are not adapted to different patient cohorts or clinical problems.

SUMMARY

Systems, methods, and non-transitory computer readable media are provided for prediction of therapy response. Radiomics are used for unsupervised machine training of an encoder-decoder network to predict based on input of image data, such as computed tomography image data and segmentation data. The trained encoder is then used to generate latent representations to be used as input to different classifiers or regressors for prediction of therapy responses, such as one classifier to predict response for an organ at risk and another classifier to predict another type of response for the organ at risk or to predict a response for the tumor.

In a first aspect, a method is provided for treatment response prediction with a machine. Medical image data representing a patient is acquired. An organ at risk and a gross tumor volume are segmented from the medical image data. A latent representation is generated from the medical image data the segmented organ at risk, and the gross tumor volume. The latent representation is generated by an encoder machine-trained in an unsupervised manner with a decoder to predict radiomic features with ground truth from hand-crafted radiomics. The treatment responses for the gross tumor volume and the organ at risk are predicted by first and second machine-trained classifiers in response to input of the latent representation from the encoder to the first and second machine-trained classifiers. The predicted treatment responses of the organ at risk and the gross tumor volume are output. The method may be provided for multiple organs at risk.

In one embodiment, computed tomography data is acquired as the medical image data. The hand-crafted radiomics used for training at least one of the encoders and at least one of the decoders include pre-defined quantification of tumor intensity, tumor shape, tumor texture, and wavelet transformation.

As another embodiment, a machine-learned network segments. The prediction is in response to input of the latent representation from the encoder and values for hidden features of the machine-learned network from the segmenting. In a further approach, a feature pyramid network predicts from the values and the latent representation with multi-scale, hierarchal features as the hidden features.

In another embodiment, the encoder is a convolutional neural network.

In yet another embodiment, the encoder was machine-trained with the decoder to predict the radiomic features and segmentation. As a further approach, the encoder was machine-trained with the decoder to predict the radiomic features, the segmentation, and information for a region of interest.

Various treatment responses may be predicted. For example, adverse effect and toxicity are predicted for the organ or organs at risk, and outcome, progression, recurrence, and/or control are predicted for the gross tumor volume. Multiple of the adverse effect, toxicity and/or outcome, and/or multiple of the progression, recurrence, and/or control may be predicted using different machine-trained classifiers with input from the latent representation from the same encoder.

According to one embodiment, a similar case is searched for with the latent representation. The output may include a visualization of the latent representation for the patient and the similar case.

In a second aspect, a medical system is provided for therapy prediction. A memory is configured to store computed tomography data. An image processor is configured to segment a tumor or organ adjacent the tumor, generate a values for a latent space by a machine-learned encoder in response to input of the computed tomography data and the segmentation of the tumor or the organ, predict a first therapy outcome by a first machine-learned classifier or regressor in response to input of the values for the latent space, and predict a second therapy outcome by a second machine-learned classifier in response to input of the values for the latent space. A display is configured to display the first and second therapy outcomes.

In one embodiment, the encoder was trained with a decoder in an unsupervised manner to predict pre-defined radiomics. The values for the latent space are bottleneck features of the encoder and decoder.

According to another embodiment, the first and second therapy outcomes are different ones of adverse effect, toxicity, outcome, progression, recurrence, and control. The first and second machine-learned classifiers or regressors were separately trained with the same encoder.

As another embodiment, the image processor is further configured to generate a visualization of the values for the latent space.

In a third aspect, a method is provided for machine training a model for therapy prediction. A network including an encoder and decoder is machine trained to predict values of radiomics in response to input of medical imaging data. A first classifier or regressor is machine trained to output a first therapy response in response to input of feature values output by the encoder. A second classifier or regressor is machine trained to output a second therapy response in response to input of the feature values output by the encoder. The encoder, first classifier or regressor, and the second classifier or regressor are stored.

In an embodiment, the machine training of the network includes unsupervised training where the radiomics comprise values quantified from hand-crafted functions.

In another embodiment, the machine training of the first and second classifiers or regressors includes machine training the first classifier or regressor for one of adverse effect or toxicity of an organ at risk and machine training the second classifier or regressor for outcome, progression, recurrence, or control of the tumor, both the first and second classifiers or regressors using the same encoder. Both the first and second classifiers or regressors using the same encoder.

According to another embodiment, the machine training of the network includes machine training the decoder to predict the values of the radiomics and to output segmentation of a tumor and/or an organ at risk from the therapy. The machine training of the first and second classifiers or regressors includes machine training with input of the segmentation and the medical imaging data to the encoder.

As yet another embodiment, the machine training of the second classifier or regressor includes training from exported feature values and segmentations to train by a party different than a party performing the training of the network.

Any one or more of the aspects described above may be used alone or in combination. Any aspects of one of method, system, or computer readable media may be used in the others of method, system, or computer readable media. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EMBODIMENTS

Representation learning for automatically contoured organs at risk and gross tumor volumes is used for building treatment planning, assessment, and outcome/toxicity prediction models for various therapy procedures, such as radiotherapy. The examples used herein are for radiotherapy but may be used for other therapies. An unsupervised system capable of deciphering generic image representations for various tasks is formed. This system can be further used to stratify patients based on the likelihood of therapy failure or the radiation toxicity effect and redirect the patients that have high risk of failure and toxicity to an alternate or modified therapy regimen. Different from traditional radiomic features that are usually hand-crafted, the deep-learning based model is completely data-driven.

Figure 1:
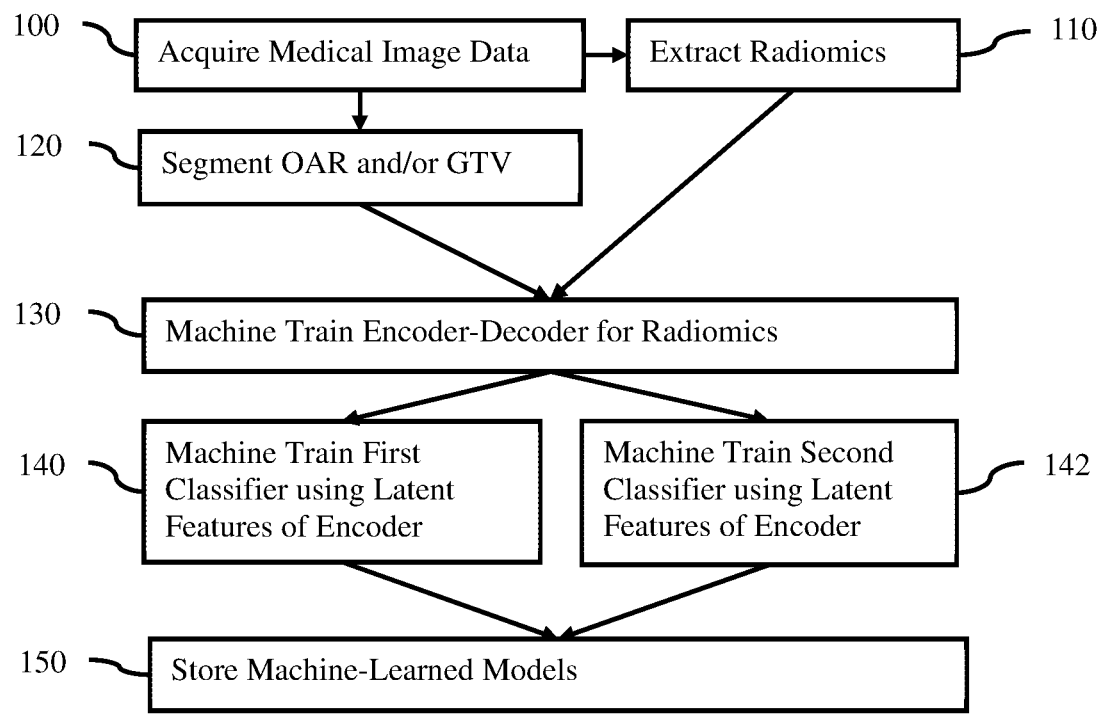
FIG. 1 is a flow chart diagram of one embodiment of a method for machine training for therapy response prediction.

FIG. 1 is a flow chart diagram of one embodiment of a method for machine training a model for therapy prediction. Part of the model is trained in an unsupervised manner to output values for pre-defined radiomics, segmentation, and/or region of interest information. The resulting encoder of the part was trained to create a latent representation or fingerprint. For therapy outcome prediction, the encoder is used with one or more (e.g., multiple) classifiers or regressors to predict therapy response based on the latent representation.

The training is performed by an image processor using training data (e.g., data samples and corresponding ground truth values or calculated quantities) stored in a database. Other devices may be used.

The acts are performed in the order shown (numerical or top-to-bottom) or other orders. For example, act 110 is performed prior to or simultaneously with act 120. Additional, different, or fewer acts may be provided. For example, act 120 for segmenting is not performed. As another example, one of acts 140 or 142 are not performed, such as where the encoder is used for one classifier. In yet another example, additional acts for training additional classifiers or regressors for different therapy responses and/or regions (e.g., other OARs or GTVs) using the unsupervised-trained encoder are provided.

In act 100, medical image data is acquired. The medical image data represents patients, such as representing an organ, head, or torso of the patients. In one embodiment, the medical image data is computed tomography (CT) data, such as two-dimensional or three-dimensional (volume) CT data. In other embodiments, ultrasound, magnetic resonance, positron emission tomography, or single photon emission computed tomography image data is acquired. The image data is data arranged as pixels or voxels and may or may not be formatted for display. The image data may be used to generate a displayed image representing the patient or may be a displayed image.

In one embodiment, the medical image data is acquired from a therapy planning scan. Imaging from the therapy planning phase or from detection of a tumor is used. Additionally, or alternatively, medical image data from during and/or after treatment is acquired.

The image data is acquired from the electronic medical records of the patients, such as in an image archival system or electronic patient medical record. The image data may be from a picture archiving and communications system (PACS). In other embodiments, the image data is acquired from an imager (e.g., CT system) and/or database (e.g., a collection of examples).

The medical image data may be pre-processed. For example, a stack of slices is transformed and/or projected into a known frame of reference. Rotation, translation, and/or scaling may be performed. Any normalization, such as remapping to a given dynamic range, may be used.

The medical image data is to be used for machine training. Accordingly, hundreds or thousands of samples are acquired.

In act 110, a processor or user extracts radiomics. For unsupervised training, quantification is used to optimize or minimize loss by the model being trained. For therapy, the quantification is radiomics. Pre-defined radiomics are used, such as radiomics shown to be predictive in published studies. One, some, or all of the pre-defined radiomics may be hand-crafted, such as user selected or created mathematical functions. Example hand-crafted radiomics for representing tumor phenotypes include size, shape, texture, and/or wavelet transform information. The image processor determines the values of the radiomics for each sample in the training data (e.g., for each medical image or set of image data).

Other information may be extracted. For example, segmentation or contours are extracted. As another example, different radiomics values are determined for different regions of interest in a sample, such as for different organs at risk and/or different tumors. Information for a region of interest, such as texture for a healthy region spaced from the tumor for the same organ in which the tumor occurs, may be extracted. The extracted information may be determined automatically rather than relying on supervised creation of the ground truth. For segmentation, a hand-crafted or previously trained segmentor may be used.

In act 120, one or more organs at risk (OAR) and/or tumor are segmented. The gross tumor volume (GTV) or other part of the tumor is segmented. Organs adjacent to the tumor and/or along the path of therapy application are OARs. The OARs may include the organ in which the tumor occurs. In one embodiment, both the GTV and one or more OARs are segmented.

The segmentation identifies a contour, such as a surface or boundary. Alternatively, the segmentation identifies an area or volume, such as labeling all voxels belonging to a given organ or tumor.

The acquired image data samples may include segmentations. Alternatively, a user (e.g., radiologist) or image processor segments. For example, an image processor segments GTV and OAR represented in the image data for each sample of the training data. In one embodiment, any approach, such as full width, half maximum (FWHM) or intensity thresholding with various standard deviations, are used to segment. In another embodiment, a machine-learned automatic contouring or segmenting model is used, such as using an image-to-image, U-Net, or encoder-decoder network trained to output the segmentation in response to input of medical image data. The machine-trained segmentor generates values for features in hidden layers in response to input of the medical image and uses the values of the features to output the segmentation.

The segmentation may be used as an output for determining a loss function in the machine training. In other embodiments, the segmentations are used as inputs to the extraction of act 110. The radiomics engine uses both the CT volume and GTV/OAR segmentations to compute the hand-crafted radiomic features of each sample.

In other embodiments, none of the training data includes segmented tissue. A border, pixel locations, or voxel locations for specific tissue (e.g., scar or lesion) is not delineated, so not used to train the multi-task model. Act 120 is not performed.

Acts 100-120 result in training data to be used in unsupervised or other machine learning. The training data includes samples each with a corresponding input and output. Many samples of the input and output are gathered.

In act 130, the image processor machine trains a network including an encoder and decoder to predict values of radiomics in response to input of medical imaging data. The model is trained to receive medical image data and segmentation (e.g., of GTV and/or OAR) at the encoder, generate a latent representation by the encoder, and generate an output radiomic by a decoder from the latent representation. The training data provides the samples of inputs to the encoder and samples of outputs from the decoder. For example, the training data includes the medical images, segmentations from the medical images of GTV and one or more OARs, and extracted values for radiomics.

For training the machine-learned model, the machine learning model arrangement is defined. The definition is by configuration or programming of the learning. The number of layers or units, type of learning, and other characteristics of the model are controlled by the programmer or user. In other embodiments, one or more aspects (e.g., number of nodes, number of layers or units, or type of learning) are defined and selected by the machine during the learning. Training data, including many samples of the input data and the corresponding output is used to train. The relationship of the input to the output is machine learned.

Figure 2:
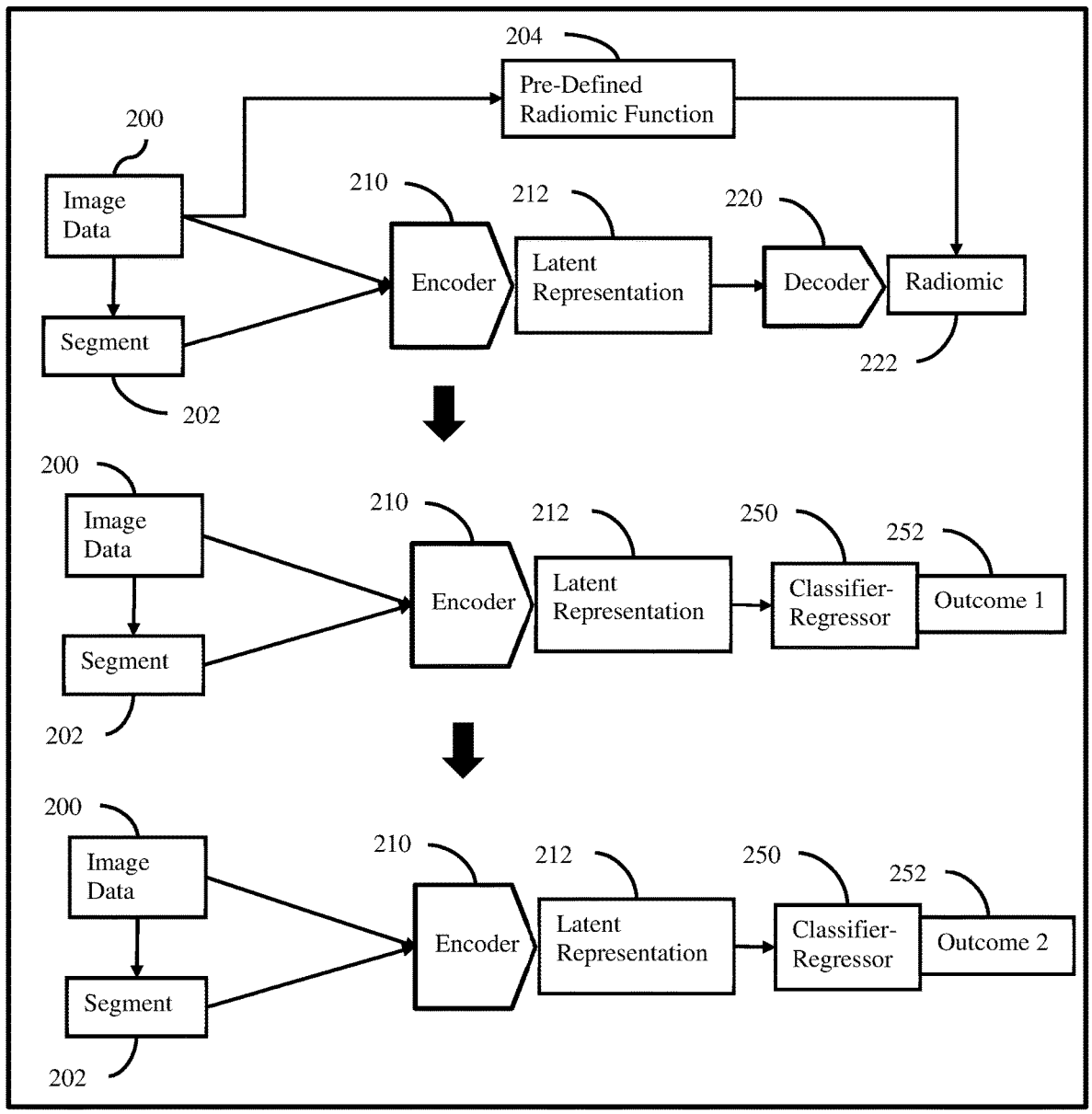
FIG. 2 is a block diagram of one embodiment of a machine-learned or machine learning model for therapy response prediction.

FIG. 2 shows an example model for machine training of act 130 (FIG. 1). The model is a neural network formed from an encoder 210 and a decoder 220. More than one decoder 220 may be provided, such as where the model is to generate multiple different outputs (e.g., one for each radiomic feature or one for the radiomic features and another for a segmentation or segmentations).

The encoder 210 has one or more layers, such as ten or more layers, with any number of nodes in each layer. Each node may use any activation function. Any types of layers may be used. In one embodiment, a series of down sampling and convolutional layers are used, such as an encoder from a U-Net or image-to-image network. Max or other pooling layer layers may be included. Dropout layers may be used. DenseNet, convolutional neural networks, ResNet, and/or other network architectures may be used for the encoder 210.

The encoder 210 increases abstraction and decreases resolution. The final layer outputs a latent representation 212. Values for one or more features are output by the encoder 210 in response to input data, such as the medical image data 200 and segmentations from the segmentor 202. The latent representation 212 are values for features at an abstracted level relative to the input image data 200 and/or segmentations. This latent representation 212 is a fingerprint for the patient.

The decoder 220 has inputs to receive the latent representation 212. The values of the features output by the encoder 210 are input to the decoder 220. The decoder 220 outputs the radiomic 222, such as a value for each of multiple different radiomics. The output is generated in response to input of the latent representation 212.

The decoder 220 is a neural network but other models may be used. The neural networks are fully connected or convolutional networks. Any number of layers and nodes in layers may be used. Various layer arrangements may be used, such as sequential layers or densely connected layers. In one embodiment, some of the layers are convolutional layers. Pooling, up-sampling, down-sampling, dropout, or other layers may be used. One layer, such as an output layer, is a Softmax layer or other layer for outputting a value, such as a quantity or a label (e.g., class). Other architectures may be used. Different numbers of stages, layers, parameters, and/or convolutions in a layer may be used. Various kernel sizes, combinations of layers, and/or types of layers may be used.

For training, the output (e.g., radiomic 222) of the decoder 220 is compared to an expected output (e.g., radiomic calculated by the engine 204). In unsupervised training, the comparison is with an output generated without user or expert creation. For example, pre-defined radiomic functions 204 are applied to the image data 200 and/or the segmentations 202 to generate values for the radiomics 222 for comparison with the values of the radiomics generated by the decoder 220. The unsupervised training uses radiomics 222 as values quantified from the hand-crafted, trial confirmed, and/or other radiomic functions 204. Given that hand-crafted radiomics (e.g., size, shape, texture, etc.) have been proved as efficient for representing tumor phenotypes, the decoder 220 is used to reconstruct radiomic features from image latent space 212.

The model has an architecture defined to output one or more of the radiomics 222 per sample. The samples include different types of tumors, organs, imaging, settings, and/or other variation. In other embodiments, the model is trained for a specific type of tumor, organ, and/or variation.

The image processor machine trains the model. The training learns values for learnable parameters (e.g., weights, connections, filter kernels, and/or other learnable parameters of the defined architecture). Deep or another machine learning may be used. The weights, connections, filter kernels, and/or other parameters are the features being learned. For example, convolution kernels are features being trained. Using the training data, the values of the learnable parameters of the model are adjusted and tested to determine the values leading to an optimum estimation of the output given an input. Adam or another optimization is used to train.

During training, the loss is minimized. The loss function for values of radiomics 222 is a mean square error between the network output and hand-crafted radiomic feature values. Other losses may be used. Using optimization, different values of the learnable parameters are tested across different samples of the training data to minimize a loss or difference between the values of the radiomics 222 generated by the pre-defined radiomic function 204 and the values generated by the decoder 220. For larger datasets with enough variety in terms sample instances, encoder-decoder architectures along with the training algorithms often outperform traditional machine learning approaches in terms of data dimension reduction and representation learning.

In one embodiment, the encoder 210 and decoder 220 are trained to predict the values of the radiomics 222 and output one or more segmentations (e.g., GTV and/or OAR). The latent space representation learning can be performed based on the entire CT volume as well as based on each GTV/OAR for finer granularity. A third alternative can be based on a clinically relevant ROI (e.g., thorax, abdomen) including multiple GTV/OARs, where the reference radiomics generated from the radiomics engine 204 are concatenated from each GTV/OAR to guide the learning process.

Where additional outputs are provided, such as segmentations and/or other information from regions of interest, the losses for the other types of outputs are minimized. A joint loss and/or combination of losses may be used in the optimization of the machine training. The loss for segmentation may be an L1, L2, or other image loss. In one embodiment, available segmentations are used in the machine training. Where some of the samples in the training data include segmentation, the model may be defined to output segmentation in one branch. For example, a decoder is added with the task of output of the segmentation. The decoder includes up sampling, pooling, convolution, and/or other layers to convert the latent representation 212 into a spatial representation of the segmentation of the tumor or organ at the same or different resolution as the medical image data 200. The segmentation may be included for some of the samples in training.

In acts 140 and 142 of FIG. 1, the image processor machine trains classifiers or regressors to output different therapy responses. In other embodiments, only one or three or more classifiers or regressors are trained to output different therapy responses.

Referring to FIG. 2, after the encoder 210 is trained, the encoder 210 is used and/or adapted to different tasks for users to build additional models 250 to assess treatment response or outcome 252. For example, the latent representation 212 of an OAR can be used to predict the radiation toxicity effects in different body regions as the outcome 252. This is achieved by applying a classifier or regressor 250 to the latent features 212 depending on the distribution of the target variable. Another usage scenario is to apply a classifier or regressor 250 on the latent space 212 to predict the probability of tumor recurrence after the treatment or the rate of progression free survival as the outcome 252.

Rather than outputting a characteristic of the tissue, such as radiomics features, therapy response is to be output. Example therapy responses include adverse effect, toxicity, outcome, progression, recurrence, or control (e.g., effectiveness) for a given therapy or for different therapies. Any response may be predicted for one or more periods, such as expected probability of recurrence after 1 year and after 2 years. The responses for the different classifiers or regressors are different in type of response being predicted, for differences in therapy, and/or for different periods.

The machine training to output the therapy response uses input of the latent representation 212 from the encoder 210. The same encoder 210 (i.e., same architecture with the same values of the learnable parameters), at least initially, is used for training the different classifiers or regressors 250. For the various samples, the encoder 210 receives as input the medical imaging data with or without the corresponding segmentations 202. In response, the encoder 210 generates the latent representations 212, which are used as inputs to the classifier or regressor 250 being trained.

Each classifier or regressor 250 is machine trained independently of the other classifiers or regressors 250, such as using the various input samples and corresponding ground truth outcomes 252 from patient records to train the classifier or regressor 250 to predict from the latent representation 212. In alternative embodiments, multi-task machine training is used. Two or more classifiers or regressors 250 are trained at a same time by combining the corresponding losses, such as a joint loss (e.g., average loss) for training the multiple classifiers or regressors 250 together.

The values of the learnable parameters of the encoder 210 are fixed in one embodiment. The encoder 210 as previously trained with the decoder 220 is used without change in training one or more of the classifiers or regressors 250. In alternative embodiments, the encoder 210 as trained is an initialization of the encoder 210. The training for the classifier or regressor (i.e., minimization of the loss) is used to re-learn or fine-tune the encoder 210 as well as learn values for learnable parameters of the regressor or classifier 250.

The regressor or classifier 250 is a neural network, support vector machine, or other architecture. In one embodiment, a DenseNet is used. In other embodiments, a fully connected or convolutional neural network is used. Different classifiers or regressors 250 may have the same or different architecture. The classifiers or regressors 250 have any number, type, and/or arrangement of layers. The classifier or regressor 250 may be a same or different architecture as the decoder 220. Since a quantity or class label is to be output, up sampling may not be provided. In one embodiment, the classifier or regressor 250 is a convolutional neural network (CNN) with pooling layers. As a classifier 250, the output layer may have a sigmoid function for predicting probability of toxicity or adverse effect, or a softmax function for outputting a class membership as the outcome 252 (e.g., toxicity level and/or pneumonitis grade) based on input of the latent representation 212. As a regressor, the output layer may be a fully connected layer for outputting a value along a continuous scale, such as the risk level of tumor reoccurrence.

Any of various optimizations may be used for machine training the regressors or classifiers 250. For example, Adam is used. Any loss may be used, such as cross-entropy loss for classification problem or partial log-likelihood loss for regression problem.

In one embodiment, the same image processor and/or same entity trains each of the classifiers or regressors 250. The same image processor and/or entity trains the encoder 210 and the classifiers or regressors 250. In other embodiments, the trained encoder 210 and/or latent representations 212 from the trained encoder 210 are provided to a different entity and/or image processor for training one or more of the classifiers or regressors 250. For example, exported feature values (i.e., latent representation 212) and segmentations 202 are used by a hospital or medical group to train one or more classifiers or regressors 250. The hospital or medical group is different than the service, manufacturer, or developer of the encoder 210. The representations 212 could be exported along with masks or segments 202 for users to build their own risk stratification, treatment assessment, and/or treatment prediction models, such as hospital or practice specific outcome prediction models.

In general, the machine training of acts 130, 140, and 142 are provided for a given object, such as an OAR or GTV. The machine training is performed separately for different OARs and/or types of GTVs. Automatically generated OARs and GTVs are used to build representations or models for the corresponding OARs and GTVs. In other embodiments, one model is trained to provide outcome prediction for multiple OARs and/or GTVs.

In act 150, the encoder 210 and one or more classifiers or regressors 250 are stored in a memory. The machine-trained model is stored. The learned weights, connections, kernels, and/or other values of the learnable parameters of the encoder 210 and classifiers or regressors 250 as learned are stored with the architecture or as part of the model. Where the encoder 210 is retrained or refined for different classifiers or regressors 250, the various resulting versions of the encoder 210 are stored.

The stored model may be used or applied. Copies of the stored model may be used or applied by different servers, image processors, computers, MR scanners, or workstations. In application, the latent representation 212 is determined based on input image data 200 and segments 202 for a patient. The encoder 210 generates the latent representation 212 for that patient, which is used as input by the classifiers and/or regressors 250 to generate different outcome predictions for that patient. The values of the learned parameters of the model, as fixed after training, are used for application to a patient or different patients (i.e., unseen data).

Figure 3:
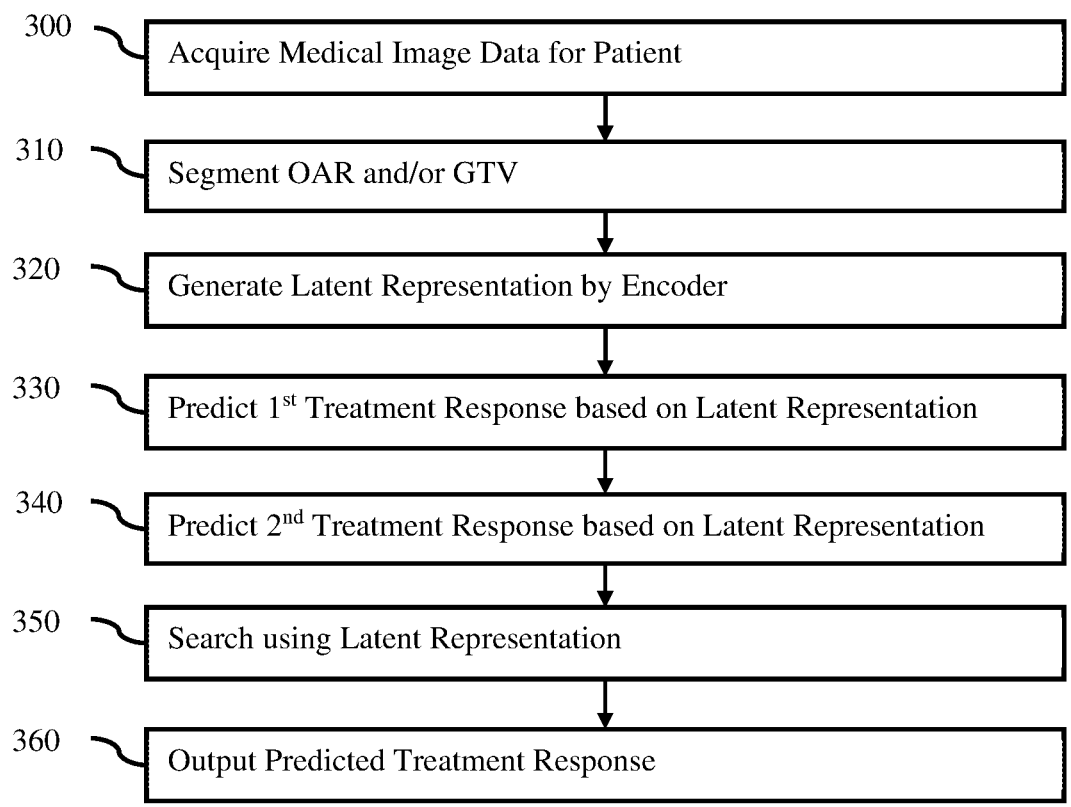
FIG. 3 is a flow chart diagram of one embodiment of a method for therapy response prediction in a medical system.

FIG. 3 is a flow chart diagram of one embodiment of a method for treatment response prediction with a machine. A machine-learned model includes sub-parts including an encoder trained, at least in part, based on prediction of radiomics, and one or more predictors of outcome trained from latent representations generated by the encoder.

The treatment response and corresponding model is for a given type and/or level (amount) of treatment. Different models are provided for different types, progressions, and/or levels of treatment. The model is used to predict outcome for a patient based on the treatment. In alternative embodiments, the model was trained to output outcomes for different treatments, allowing comparison of estimated outcomes for a patient by treatment type, progression, and/or level.

Figure 4:
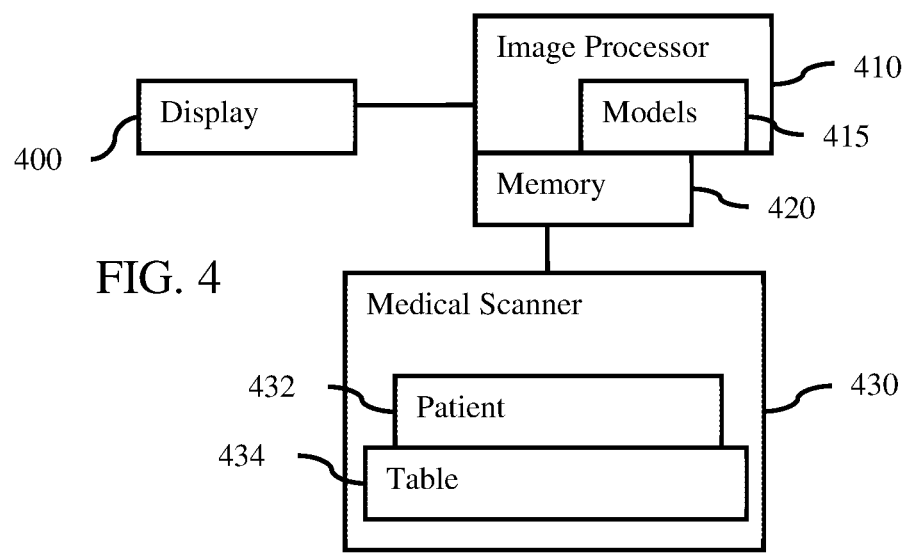
FIG. 4 is a block diagram of one embodiment of a medical system for therapy prediction.

The method of FIG. 3 is performed by a medical scanner or image processor of FIG. 4 or another system. For example, a CT scanner acquires image data. The image processor segments, generates a latent representation, predicts treatment responses, and searches. The image processor may generate an image. A display, based on an image created by the image processor, displays the image.

The method is performed in the order shown (e.g., top to bottom or numerical), but other orders may be used. For example, acts 330, 340, and 350 are performed in reverse or other order. Additional, different, or fewer acts may be provided. For example, act 350 is not provided. In another example, act 340 is not performed. In yet another example, act 310 is not performed, such as where the latent representation is generated, and outcome predicted without segmentation. As another example, acts for configuring the scanning are performed based on user input or other information.

In act 300, a medical scanner (e.g., CT scanner or imaging system) acquires medical image data representing a patient. The patient is scanned. The resulting reconstruction and/or image is the medical image data. In other embodiments, the medical image data for a patient is acquired from memory or transfer over a computer network. Other types of data may be acquired.

In act 310, an image processor segments one or more OARs and/or a GTV from the medical image data. A contour, surface, border, area, and/or volume corresponding to the OAR and/or GTV is identified.

The segmentation is performed using any process or function, such as intensity thresholding with low pass filtering. In one approach, a machine-learned network, such as an encoder-decoder, outputs the segmentation or segmentations in response to input of the medical image data.

In act 320, the image processor generates a latent representation from the medical image data, the segmented organ at risk, and/or the segmented gross tumor volume. The medical image data with or without segmentations are input to the encoder. In response to input, the encoder generates the latent representation as a fingerprint for the patient, such as values of features at a bottleneck or output of the encoder. Features from other hidden layers of the encoder may be used. Values for features from any layers of a machine-learned segmentation model may be added or also included with the values of the features from the output of the encoder.

The determination is performed by or using a machine-learned model. The machine-learned model may be a neural network, such as a deep learned neural network. A fully connected neural network, convolutional neural network, fully convolutional network, dense net, and/or another neural network may be used. In one embodiment, an encoder of an image-to-image network (e.g., U-net) is used, such as an encoder that increases abstraction and decreases resolution, providing values for bottleneck features. For example, the encoder 210 of FIG. 2 is used. The encoder 210 receives the input of the image data 200 and the segmentations 202 and outputs the latent representation 212. A support vector machine, clustering based machine learning, Bayesian, or other machine-learned regressor may be used.

The machine-learned model operates based on how the model was trained. Different training results in different values of learnable parameters, so results in different operation. The encoder or another machine-learned model for generating the latent representation was trained with a decoder or other model to output radiomics, segmentation for one or more regions (e.g., OARs and/or GTVs), and/or information for a region of interest (e.g., for a region spaced or separate from the OAR or GTV).

In one embodiment, the latent representation is generated by the encoder that was machine-trained in an unsupervised manner with a decoder to predict radiomic features with ground truth from hand-crafted and/or pre-defined radiomics. The hand-crafted or pre-defined radiomics used for training the encoder and decoder were pre-defined quantifications of tumor intensity, tumor shape, tumor texture, and/or wavelet transformation.

In an optional act, the decoder may be used to generate values for radiomics from the latent representation. Estimates of the radiomics may be used to assist in diagnosis, prognosis, and/or outcome prediction.

In acts 330 and 340, the image processor predicts one or more treatment responses. Different treatment responses are predicted by different machine-learned classifiers or regressors. The differences may be in the region (e.g., OAR vs. GTV), therapy, and/or type of response (e.g., toxicity or adverse effect and time to recurrence).

The predictions are for one or more of various outcomes for a given therapy and/or for different therapies. For example, the predictions are adverse effect and/or toxicity for one or more organs at risk and are outcome, progression, recurrence, and/or control for the tumor or gross tumor volume. Multiple of the adverse effect and/or toxicity for the organ or organs at risk and/or multiple of the outcome, progression, recurrence, and/or control for the tumor are predicted using different machine-trained classifiers or regressors with input from the latent representation from the same encoder. The outcome may be predicted for different regions (e.g., OARs and/or GTVs).

The prediction is performed by or using a machine-trained classifier or regressor. The machine-learned classifier or regressor may be a neural network, such as a deep learned neural network. The machine-learned classifier or regressor is any machine-learned classifier or network. For example, a neural network is used to regress the relationship between the input latent representation and the output outcome. A fully connected neural network, convolutional neural network, fully convolutional network, dense net, and/or another neural network may be used. A support vector machine, clustering based machine learning, Bayesian, or other machine-learned regressor or classifier may be used.

The machine-learned classifier or regressor operates based on how the classifier or regressor was trained. Different training results in different values of learnable parameters, so results in different operation. The machine-trained classifier or regressor outputs the predicted outcome in response to input of the latent representation from the encoder. In one embodiment, the classifier or regressor 250 of FIG. 2 outputs the outcome in response to input of the latent representation from the encoder 210.

In an alternative embodiment, the machine-learned classifier or regressor 250 receives inputs in addition to the latent representation 212 generated by the encoder 210. For example, values of hidden features of a machine-learned network for segmentation are concatenated with the values of the features of the latent representation 212. The prediction of outcome may use a feature pyramid network, where the values from the segmentation features and the latent representation are used. Any of the features, such as from the segmentation, may be multi-scale, hierarchal features as the hidden features used as input for prediction of outcome.

In act 350, the image processor searches for a similar case. The search may be for any number of the most similar cases or patients. For example, the ten most similar patients to a current patient are identified from a database of patients, such as the same database used for the training data.

The identified similar patients may show treatments that worked and/or did not work. For example, the identification of treatments may be used to select the machine-learned models to then apply for the predictions of acts 330 and 340. As another example, the identification of similar patients may be used to allow for further study by a treating physician for making treatment plans.

The search uses the latent representation. A distance function based on the latent space is used to measure the similarity between each pair of cases. The latent representation for a given patient is compared to latent representations for other patients.

In one example, a Euclidian Distance $\mathcal{D}(x_i, x_j) = \|x_i - x_j\|_2$ or Cosine Similarity $$\mathcal{D}(x_i, x_j) = \frac{x_i^T x_j}{\|x_i\|\|x_j\|},$$

where $x_i$ and $x_j$ are features in latent space of two GTV/OAR ROIs. The similarity metric can be also learned based on the distribution of training samples in a supervised manner. In another example, the Mahalanobis Distance $\mathcal{D}(x_i, x_j) = (x_i - x_j)^T M(x_i - x_j)$, where M is a matrix that is estimated from the covariance matrix of training data, is used. Another approach is to learn better representations by jointly training a variational autoencoder (VAE) and a generative adversarial network (GAN) discriminator to measure sample similarities. A smaller distance between two image ROIs indicates higher similarity of their image contents and, furthermore, higher probability of very close treatment outcomes.

In act 360, the predicted treatment response is output as an image. A display displays the outputs from application of the machine-learned model. The values or classes output by the model (e.g., classifiers or regressors 250) or information derived therefrom may be displayed. The image processor generates an image showing the values. The image may include a representation of the patient's tissue, such as a CT image showing OAR and/or GTV. The values may be annotations on the CT image. In alternative, or additional, embodiments, the output is to a patient medical record or radiology report, which may be displayed. The values are communicated to the user by display of the image.

The display is text (e.g., alphanumeric), graph, or highlighting. The predicted outcome or outcomes, with or without segmentation, values of radiomics, and/or representation of the patient, are displayed. The predicted treatment response or responses of the organ at risk and/or the gross tumor volume are output. Links and/or data (e.g., outcome) from similar patients may be displayed as well.

In a further embodiment, a visualization of the latent representation 212 for the patient, one or more similar cases, and/or a cohort is output. To visualize these latent representations, the high-dimensional latent vectors can be projected to a 2-D or 3-D space using dimension reduction techniques, such as t-SNE or UMAP. Tools for the user to visualize these representations for various patient cohorts (e.g., how does the liver representation for a cohort change after RT or Immunotherapy, etc.) may be provided. For population analysis, the abovementioned data-driven latent representation learning approach can be deployed to a CT data pool. The latent space can be filled up with existing CT data by their latent features. Such a latent representation database can be used for referencing patients or datasets given any unseen CT volumes. The historical medical records, treatment plans, and outcomes of relevant patients (presumably close in latent space) can be also retrieved accordingly.

FIG. 4 shows one embodiment of a medical system for therapy prediction. The medical system includes the display 400, memory 420, and image processor 410. The display 400, image processor 410, and memory 420 may be part of the medical scanner 430 (e.g., CT scanner), a computer, server, workstation, or other system for image processing medical images from a scan of a patient. A workstation or computer without the medical scanner 430 may be used as the medical system.

Additional, different, or fewer components may be provided. For example, a computer network is included for remote image generation of locally captured image data or for local prediction from remotely captured image data. The machine-learned models 415 are applied as standalone applications on the workstation or a local device or as a service deployed on network (cloud) architecture. As another example, a user input device (e.g., keyboard, buttons, sliders, dials, trackball, mouse, or other device) is provided for user alteration of segmentation or placement of one or more markers (e.g., landmarks). In yet another example, the medical scanner 430 is not provided.

The image data (e.g., CT volume or slice data), segmentation, ROI information, GTV, OAR, machine-learned model definition, values of learned parameters, machine-learned models 415, feature values (e.g., latent representation), values of radiomics, predicted outcomes, display image, and/or other information are stored in a non-transitory computer readable memory, such as the memory 420. The memory 420 is an external storage device, RAM, ROM, database, and/or a local memory (e.g., solid state drive or hard drive). The same or different non-transitory computer readable media may be used for the instructions and other data. The memory 420 may be implemented using a database management system (DBMS) and residing on a memory, such as a hard disk, RAM, or removable media. Alternatively, the memory 420 is internal to the processor 410 (e.g., cache).

The instructions for implementing the training or application processes, the methods, and/or the techniques discussed herein are provided on non-transitory computer-readable storage media or memories, such as a cache, buffer, RAM, removable media, hard drive, or other computer readable storage media (e.g., the memory 420). Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code, and the like, operating alone or in combination.

In one embodiment, the instructions are stored on a removable media device for reading by local or remote systems. In other embodiments, the instructions are stored in a remote location for transfer through a computer network. In yet other embodiments, the instructions are stored within a given computer, CPU, GPU, or system. Because some of the constituent system components and method steps depicted in the accompanying figures may be implemented in software, the actual connections between the system components (or the process steps) may differ depending upon the manner in which the present embodiments are programmed.

The image processor 410 is a controller, control processor, general processor, micro-processor, tensor processor, digital signal processor, three-dimensional data processor, graphics processing unit, application specific integrated circuit, field programmable gate array, artificial intelligence processor, digital circuit, analog circuit, combinations thereof, or other now known or later developed device for processing image data. The image processor 410 is a single device, a plurality of devices, or a network of devices. For more than one device, parallel or sequential division of processing may be used. Different devices making up the image processor 410 may perform different functions. In one embodiment, the image processor 410 is a control processor or other processor of the medical scanner 430. The image processor 410 operates pursuant to and is configured by stored instructions, hardware, and/or firmware to perform various acts described herein.

The image processor 410 or another remote processor is configured to train machine learning architectures. Based on a user provided or other source of the network architecture and training data, the image processor 410 learns to relate one or more input variables (e.g., image data and segmentations) to outputs (e.g., radiomics for training the encoder and outcomes for training the classifiers or regressors). The result of the training is a machine-learned model 415 including the encoder or encoders and one or more classifiers or regressors.

Alternatively, or additionally, the image processor 410 is configured to apply the machine-learned models 415 (i.e., apply the encoder and one or more classifiers and/or regressors). The machine-learned model 415 may include a machine-learned network for segmenting OARs and/or GTVs.

The image processor 410 is configured to segment a tumor and/or organ adjacent the tumor. The image processor 410 is configured to generate values for a latent space by application of a machine-learned encoder. In response to input of the image data (e.g., CT volume data) and the segmentation of the tumor and/or the organ, the machine-learned encoder generates the values for the latent representation. The encoder was previously trained, at least in part or entirely, with a decoder in an unsupervised manner to predict pre-defined radiomics. The values for the latent space are bottleneck features of the encoder and decoder, such as output values of the encoder. In other embodiments, other features, such as from hidden layers of the encoder and/or segmentation, are used in addition to the values of the latent space output by the encoder.

The image processor 410 is configured to predict at least one therapy outcome. The values of the latent representation are input to a machine-learned classifier or regressor. In response to input of the values for the latent space, the machine-learned classifier or regressor outputs the predicted outcome or outcomes. For example, the predicted adverse effect or toxicity is predicted for one or more OARs. As another example, the effectiveness, control, or recurrence of a GTV is predicted. The prediction is for a given treatment or different predictions for different treatment options are output.

The image processor 410 may configured to predict multiple different therapy outcomes using different machine-learned classifiers and/or regressors in response to input of the values for the latent space. The encoder used for separately or jointly training the different classifiers or regressors is used to generate the latent representation input to the multiple classifiers or regressors in one embodiment. The same encoder is used in application or different encoders based on or refined from the same original encoder are used.

The image processor 410 is configured to generate an output, such as values and/or labels for outcomes, a suggested treatment derived from (e.g., based on weighted combination) predicted outcomes, and/or a list of similar cases. The image processor 410 may be configured to generate a visualization of the values for the latent space.

The display 400 is a CRT, LCD, projector, plasma, printer, tablet, smart phone or other now known or later developed display device for displaying the output, such as an image of values or labels of the predicted outcome with or without an image of the patient tissue, OAR, and/or GTV (e.g., image from the medical scanner 430).

The medical scanner 430 is a diagnostic scanner. The scanner 430 operates pursuant to one or more settings to scan a patient 432 resting on a bed or table 434. The settings control scanning including transmission, reception, reconstruction, and image processing. A scanning protocol is followed to generate data representing the patient 432, such as CT image data representing part of the patient. The patient 432 is imaged by the scanner 430 using the settings.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for treatment response prediction with a machine, the method comprising:
    acquiring medical image data representing a patient;
    segmenting an organ at risk and a gross tumor volume of a tumor from the medical image data, the segmented organ at risk being of an entirety of the organ at risk, and the segmented gross tumor volume being separate from the segmented organ at risk;
    generating a latent representation from the medical image data, the segmented organ at risk, and the gross tumor volume as three separate inputs to an encoder, the latent representation generated by the encoder machine-trained in an unsupervised manner with a decoder to predict radiomic features with ground truth from hand-crafted radiomics;
    predicting separate treatment responses for the gross tumor volume and the organ at risk by first and second machine-trained classifiers, respectively, in response to input of the latent representation from the encoder to both the first and second machine-trained classifiers, the treatment response for the organ at risk being adverse effect on or toxicity of the organ; and
    outputting the treatment responses of the organ at risk and the gross tumor volume.

2. The method of claim 1 wherein acquiring comprises acquiring computed tomography data as the medical image data, and wherein the hand-crafted radiomics used for training the encoder and decoder comprised pre-defined quantification of tumor intensity, tumor shape, tumor texture, and wavelet transformation.

3. The method of claim 1 wherein segmenting comprises segmenting with a machine-learned network, and wherein predicting comprises predicting in response to input of the latent representation from the encoder and values for hidden features of the machine-learned network from the segmenting.

4. The method of claim 3 wherein predicting comprises predicting as a feature pyramid network from the values and the latent representation with multi-scale, hierarchal features as the hidden features.

5. The method of claim 1 wherein generating comprises generating by the encoder comprising a convolutional neural network.

6. The method of claim 1 wherein generating comprises generating where the encoder was machine-trained with the decoder to predict the radiomic features and segmentation.

7. The method of claim 6 wherein generating comprises generating where the encoder was machine-trained with the decoder to predict the radiomic features, the segmentation, and information for a region of interest.

8. The method of claim 1 wherein predicting the treatment response comprises predicting progression, recurrence, or control of the tumor.

9. The method of claim 8 wherein predicting comprises predicting multiple of the adverse effector toxicity to the organ at risk and multiple of progression, recurrence, or control of the tumor using different machine-trained classifiers with input from the latent representation from the same encoder.

10. The method of claim 1 further comprising searching for a case based on a measure of similarity using the latent representation.

11. The method of claim 10 wherein outputting further comprises outputting a visualization of the latent representation for the patient and the case.

12. A medical system for therapy prediction, the medical system comprising:
    a memory configured to store computed tomography data;
    an image processor configured to segment a tumor or organ at risk adjacent the tumor, generate values for a latent space by a machine-learned encoder in response to input of the computed tomography data and the segmentation of the tumor or the organ, predict a first therapy outcome by a first machine-learned classifier or regressor in response to input of the values for the latent space, predict a second therapy outcome by a second machine-learned classifier or regressor in response to input of the values for the latent space, the values for the latent space input to the first and second machine-learned classifiers or regressors being the same, the first and second therapy outcomes comprising different treatment responses; and a display configured to display the first and second therapy outcomes.

13. The medical system of claim 12 wherein the encoder was trained with a decoder in an unsupervised manner to predict pre-defined radiomics, and wherein the values for the latent space are bottleneck features of the encoder and decoder.

14. The medical system of claim 12 wherein the first and second therapy outcomes are different ones of adverse effect, toxicity, outcome, progression, recurrence, and control, where the first and second machine-learned classifiers or regressors were separately trained with the same encoder.

15. The medical system of claim 12 wherein the image processor is further configured to generate a visualization of the values for the latent space.

16. A method for machine training a model for therapy prediction, the method comprising:

machine training a network comprising an encoder and decoder to predict values of radiomics in response to input of medical imaging data;

machine training a first classifier or regressor to output a first therapy response in response to input of feature values output by the encoder, the first therapy response comprising a first probability of occurrence or a first class membership as a grade or level;

machine training a second classifier or regressor to output a second therapy response in response to input of the feature values output by the encoder, the input to the second classifier being a same as the input to the first classifier, the second therapy response comprising a second probability of occurrence or a second class membership as a grade or level; and storing the encoder, first classifier or regressor, and the second classifier or regressor.

17. The method of claim 16 wherein machine training the network comprises unsupervised training where the radiomics comprise values quantified from hand-crafted functions.

18. The method of claim 16 wherein machine training the first and second classifiers or regressors comprises machine training the first classifier or regressor for one of adverse effect or toxicity of an organ at risk and machine training the second classifier or regressor for outcome, progression, recurrence, or control of the tumor, both the first and second classifiers or regressors using the same encoder.

19. The method of claim 16 wherein machine training the network comprises machine training the decoder to predict the values of the radiomics and to output segmentation of a tumor and/or an organ at risk from the therapy, and wherein machine training the first and second classifiers or regressors comprises machine training with input of the segmentation and the medical imaging data to the encoder.

20. The method of claim 16 wherein machine training the second classifier or regressor comprises training from exported feature values and segmentations to train by a party different than a party performing the training of the network.

* * * * *